United States Patent [19]

Sada et al.

[11] Patent Number: 4,665,354
[45] Date of Patent: May 12, 1987

[54] BATTERY VOLTAGE REGULATOR FOR VEHICLES

[75] Inventors: Takeshi Sada, Oubu; Hidetoshi Kato, Suzuka; Hiroshi Shibata, Oubu; Kazumasa Mori, Chita; Nobuo Mayumi, Oubu; Hirohide Sato, Toyokawa; Yoshio Akita, Chiryu; Shigeru Tanaka, Kariya, all of Japan

[73] Assignee: Nippondenso Co., Ltd., Kariya, Japan

[21] Appl. No.: 762,832

[22] Filed: Aug. 6, 1985

[30] Foreign Application Priority Data

Aug. 8, 1984 [JP] Japan .................................. 59-167216
Aug. 27, 1985 [JP] Japan .................................. 59-177778

[51] Int. Cl.$^4$ .............................................. H02J 7/16
[52] U.S. Cl. ........................................ 320/64; 322/28; 322/99; 361/21
[58] Field of Search ................ 322/28, 99; 320/64, 320/68; 361/18, 20, 21

[56] References Cited

U.S. PATENT DOCUMENTS

| | | | |
|---|---|---|---|
| 3,835,363 | 9/1974 | Kirk | 322/28 X |
| 3,866,106 | 2/1975 | Taguchi et al. | 361/18 X |
| 4,258,307 | 3/1981 | Mori et al. | 320/64 X |
| 4,297,631 | 10/1981 | Nicol et al. | 320/64 |
| 4,418,311 | 11/1983 | Torii et al. | 322/28 X |

FOREIGN PATENT DOCUMENTS 60-109731 6/1985 Japan .

*Primary Examiner*—R. J. Hickey
*Attorney, Agent, or Firm*—Cushman, Darby & Cushman

[57] ABSTRACT

A battery voltage regulator for a vehicle charging system includes a voltage control circuit for controlling a battery terminal voltage and an external terminal connected to the positive terminal of a battery through the series combination of a charge lamp and an ignition switch. The regulator is at least composed of a charge lamp drive circuit responsive to a generation output of an alternator in order to energize the charge lamp, a power supply circuit responsive to the potential at the above mentioned external terminal to supply operational power to the voltage control circuit, and a malfunction-preventing circuit connected between the above mentioned external terminal and ground. The malfunction-preventing circuit prevents the power supply circuit from operating by disturbances such as leakage current flowing into the regulator through the external terminal. The regulator may further include a backup circuit responsive to the generation output of the alternator to separately supply operational power to the regulator circuit irrespective of the operation of the power supply circuit when the generation output reaches a voltage value which is higher than the above mentioned potential value at the external terminal by which the power supply circuit is energized, whereby the battery terminal voltage may be continuously maintained constant to a desired level even when a break in the charge lamp conductor has occurred.

7 Claims, 4 Drawing Figures

4,665,354

BATTERY VOLTAGE REGULATOR FOR VEHICLES

BACKGROUND OF THE INVENTION

1. Field of the Invention

The present invention relates to a battery voltage regulator for vehicles for controlling energization of a vehicle generator, and more particularly to a battery voltage regulator executing the above operation in response to a voltage which appears at a juncture between the collector of a lamp drive transistor and a charge lamp connected to a battery through a series-connected key switch.

2. Brief Description of Prior Art

To control the excitation of the field winding in response to an output of a voltage regulator, wherein a voltage regulating circuit of the voltage regulator for controlling battery voltage to a desired value is energized by a battery, the voltage regulator must have an external terminal through which a key switch is connected to the battery. The voltage regulator is disconnected from the vehicle battery by the key switch when the vehicle engine is not in operation in order to prevent discharge of the battery through the regulator circuit and various electrical loads. In addition, there must be provided another external terminal if a charge lamp is provided for warning when the generation of power is stopped for some reason.

On the other hand, regulator circuits have now been reduced in size by utilizing IC technology, however, this has caused a relative increase in the ratio of the area occupied by the external terminals, electrically connecting the regulator with the external circuits, to the size of the regulator casing. Therefore, it is an urgent need to provide a compact regulator which requires a minimum number of external terminals or conductors from the key switch. In order to meet such requirements, Japanese unexamined patent application No. 58-215,715 proposes a solution, which provides just one common external terminal to which the key switch and the change lamp are connected in series with the battery, thus reducing the external terminals in number.

The above mentioned regulator is composed of a combination of the key switch and the charge lamp in series, one end of which is connected to the positive terminal of the battery and the other end to the aforementioned common external terminal. The voltage regulating circuit is supplied power for the first time to maintain the battery terminal voltage at a desired set value when a terminal voltage detecting circuit detects the voltage value which appears at the common external terminal, which is higher than a predetermined value. The terminal voltage detecting circuit comprises a transistor connected to the common external terminal, so that if the key switch becomes leaky, this will prevent leakage current from flowing through the transistor and will prevent a relatively high voltage between the common external terminal and ground, which would cause the terminal voltage detecting circuit to erroneously operate the voltage regulating circuit in spite of the fact that the key switch is not actually activated yet.

Moreover, even during normal operation of the charging system, if eventual failure of the charge lamp or a break in the lamp conductor occurs, this may cause a problem in that the power supply to the voltage regulating circuit will be stopped with a sudden drop in voltage accross the common external terminal. This problem results in malfunction of the terminal voltage detecting circuit because of the low terminal voltage, almost zero at the common terminal, with no power generation from the generator.

SUMMARY OF THE INVENTION

It is therefore an object of the present invention to provide a battery voltage regulator for vehicles that may be controlled through a single common conductor from the key switch of a vehicle.

It is another object of the present invention to provide a vehicle battery voltage regulator arrangement of the foregoing type where opening and closing the key switch is precisely detected in spite of a certain amount of leakage current flowing through the key switch conductor.

It is a further object of the present invention to provide a vehicle battery voltage regulator arrangement of the foregoing type where if a break in the charge lamp conductor occurs, the voltage regulator can continue to control the battery voltage through the continual power generation of the vehicle generator.

These objects and other objects, features and advantages of the present invention will be apparent from the following description of the preferred embodiments when considered in conjunction with the accompanying drawings.

DETAILED DESCRIPTION OF PREFERRED EMBODIMENTS

Figure 1:
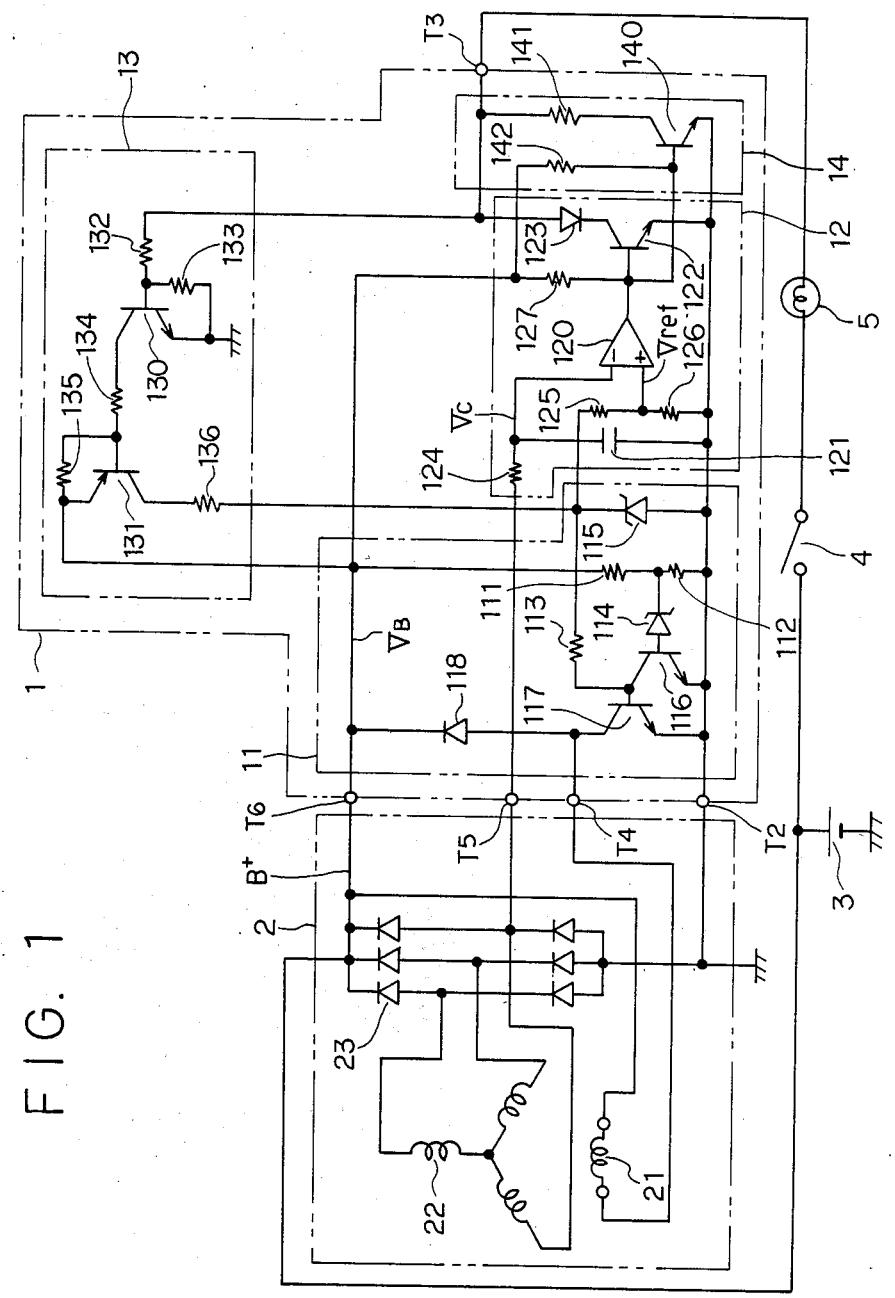
FIG. 1 is an electric wiring diagram of a first embodiment of a battery voltage regulator for vehicles according to the present invention.

Refering now to FIG. 1, a first embodiment according to the present invention, there is shown a battery voltage regulating system which is composed generally of a battery 3, an alternator 2 and a voltage regulating circuit 11. The alternator 2 is connected to the voltage regulating circuit 11 through three conductors at the corresponding external terminals $T_2$, $T_4$ and $T_6$ of a voltage regulator 1 of the present invention. The output of the alternator 2 is also connected to the positive terminal of the battery 3 directly connected to another external terminal $T_3$ of the regulator 1 through a series combination of a key switch 4 and a charge lamp 5. Within the regulator 1, a charge lamp drive circuit 12 at its output side is connected to the external terminal $T_3$ and the input sides are connected to the alternator 2 through the external terminals $T_5$ and $T_6$, respectively. A malfunction preventing circuit 14 is also connected between the external terminal $T_3$ and ground. A power supply circuit 13 is connected to the external terminal $T_3$ at one side and receives an input signal therefrom and the other side is connected to the voltage regulating circuit 11.

The alternator 2 may be of known type, having a rotating field winding 21, stator output windings 22, an end of each being commonly connected and the other end of each winding being connected to respective junctures between three positive diodes and an even number of negative diodes, the diodes making up a full-wave bridge rectifier 23. Since the output of the alternator 2 is directly connected to the positive terminal of the battery 3, the battery 3 is charged by the rectified d.c. current from the rectifier 23. The commonly connected anode of each negative diode is connected to ground. On the other hand, the commonly connected cathode of each positive diode, one of the junctures between the positive and negative diodes, one side of the rotating field winding 21, and a ground conductor are respectively connected to the regulator 1 through the external terminals $T_6$, $T_5$, $T_4$ and $T_2$.

The voltage regulating circuit 11 may also be of known type, in this embodiment, composed of resistors 111 to 113, Zener diodes 114 and 115, transistors 116 and 117, and a field discharge diode 118. Connected in series between the external terminal $T_6$ ($V_B$ line) and ground are resistors 111 and 112 defining a tap therebetween connected to Zener 114, the anode of which is connected to the base of transistor 116. The collector of transistor 116 and the base of transistor 117 are both connected to the cathode of Zener 115 through resistor 113 and the both emitters are grounded. The anode of Zener 115 is also grounded. The collector of transistor 117 is connected to both the external terminals $T_4$ and the field discharge diode 118, the cathode of which is connected to the external terminal $T_6$ ($V_B$ line).

The charge lamp drive circuit 12 is composed of comparator 120, capacitor 121, NPN transistor 122, level shift diode 123, and resistors 124 to 127. The inverting terminal of comparator 120 is connected to both the external terminal $T_5$ through resistor 124 and capacitor 121 connected to ground and its non-inventing terminal is connected to a tap between the series combination of resistors 125 and 126, one side of which is grounded and the other side is connected to the cathode of Zener 115 used as a constant voltage supply source for the voltage regulating circuit 11 and as a reference voltage supplier with parallelly connected voltage dividing resistors 125 and 126 for comparator 120. The output of comparator 120 is connected to both the base of transistor 122 and the external terminal $T_6$ through the base-biasing resistor 127. The emitter of transistor 122 is grounded and its collector is connected to the cathode of diode 123, the anode of which is connected to both the external terminal $T_3$ and the power supply circuit 13 which will be hereinafter described.

The power supply circuit 13 is composed of NPN transistor 130, PNP transistor 131 and resistors 132 to 136. The base of NPN transistor 130 is connected through resistor 132 to the external terminal $T_3$ and the emitter is connected to ground, the collector of which is connected to the base of PNP transistor 131 through resistor 134. Resistor 133 is parallely connected across the base and emitter of transistor 130 thereby biasing its base. The emitter of PNP transistor 131 is connected to the external terminal $T_6$ and the collector is connected to the cathode of Zener 115 through resistor 136, thereby completing the power supply path from the positive terminal of the battery 3 to the voltage regulating circuit 11. In order to complete such path, PNP transistor 131 is biased by the voltage drop across the parallely connected resistor 135 by the conduction of transistor 130.

Finally, the malfunction preventing circuit 14 is composed of NPN transistor 140 and resistors 141 and 142.

The base of NPN transistor 140 is connected to both the base of transistor 122 and one side of resistor 142, the other end of which is connected to the external terminal $T_6$. The collector of transistor 140 is connected to the external terminal $T_3$ through the leakage current compensating resistor 141 and the emitter is connected to ground.

With the construction of the above described first embodiment, the operation will now be explained. When the key switch 4 is not closed yet, no voltage appears at the external terminal $T_3$ as it is disconnected from the battery 3, so that NPN transistor 130 and PNP transistor 131 can not be biased into conduction from the battery 3 via the external terminal $T_3$, this means that the voltage regulating circuit 11 and the charge lamp drive circuit 12 can not be supplied power from the output of the alternator 2. Therefore, transistor 117 is initially biased off and there is no field excitation path through the positive terminal of the battery 3, the field windings 21, the collector to emitter junction of transistor 117, and ground. On the other hand, the positive potential (B+) of the battery 3 is applied to the commonly connected base of transistors 122 and 140, however, not biasing those transistors 122 and 140 into conduction.

Upon the closure of the key switch 4, there appears a potential at the external terminal $T_3$ as current flows through the battery positive terminal, the charge lamp 5, the terminal $T_3$, resistor 141 and the collector to emitter junction of transistor 140, so that the potential at $T_3$ is substantially a divided voltage of the battery terminal voltage by the internal resistance of lamp 5 and resistor 141 because the voltage drop across the collector to emitter junction is very low. The resulting potential at $T_3$ biases the base of transistor 130 through resistor 132 into conduction. At the instant of the turn on of transistor 130, transistor 131 becomes turned ON, thereby completing the power supply path from the positive terminal of the battery 3 to the voltage regulating circuit 11 and energizing the regulating circuit 11. Even at this time, since the alternator 2 is not running yet and no potential appears at $T_5$ or at the inverting terminal of comparator 120, comparator 120 generates a high level output because a reference voltage Vref divided by resistors 125 and 126 is normally applied to the non-inverting terminal. Therefore, transistors 122 and 140 are held ON until the inverting terminal voltage of comparator 120 becomes larger than the reference voltage Vref. At this time, the voltage at $T_3$ is suddenly decreased to a voltage developed across the level shift diode 123 and the collector to emitter junction of transistor 122. However, resistors 132 and 133 are adequately designed to bias transistors 130 into conduction from the voltage at $T_3$, which is the sum of the forward voltage across the forward-biasing diode 123 and the collector to emitter voltage across the junction of transistor 122, thereby holding NPN and PNP transistors 130 and 131 ON.

On the other hand, in the voltage regulating circuit 11, the starting battery voltage applied to the conductor $V_B$ via the external terminal $T_6$ is lower than a desired set value and the cathode voltage of Zener 114 is insufficient to breakdown Zener 114 so that transistor 117 is biased into conduction from the constant voltage of zener 115 through resistor 113, resulting in completion of the field excitation path through the field winding 21.

As the engine, omitted from FIG. 1 for clarity, starts up, the alternator 2 also starts its generation of power with an increasing voltage at $T_5$. Thereafter, when the increasing voltage at $T_5$ reaches the reference voltage Vref, the output comparator 120 goes low, thus causing transistors 122 and 140 to turn off. At the instant transistors 122 and 140 turn off, the potential at $T_3$ is almost the battery terminal voltage, therely causing the charge lamp 5 to come off. In the meantime, transistor 117 is repetitively opened and closed in order to maintain the output voltage of the alternator 2 to the desired set value.

Upon the opening of key switch 4, the potential at $T_3$ becomes zero so that NPN and PNP transistors 130 and 131 both immediately turn off, thereby stopping power supply to the voltage regulating circuit 11 with the resulting open path in the field excitation circuit because transistor 117 becomes turned off and the potential at $T_5$ decreases accordingly. when the potential at $T_5$ becomes lower than the reference voltage Vref, the output of comparator 120 in turn becomes high level thereby biasing the commonly connected base of transistors 122 and 140 from the battery 3 through the bias resistors 127 and 142. However, transistors 122 and 140 do not conduct yet at this time and are ready for being driven from this state to conduction at any time when key switch 4 is again closed. As having been described above, power supply to the voltage regulating circuit 11 is satisfactorily effected by detecting all the time the potential at $T_3$.

Figure 2:
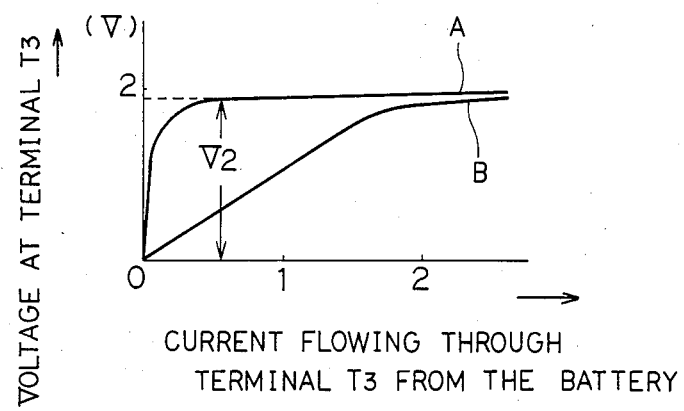
FIG. 2 is voltage-current characteristics at a common external terminal of the first embodiment.

Next, the role of the malfunction preventing circuit 14 will be briefly explained by referring to FIG. 2, in which curve A shows voltage-current characteristics at $T_3$ without the malfunction preventing circuit 14 composed of transistor 140 and resistors 141 and 142. The potential at $T_3$ has semiconductor characteristics without the malfunction preventing circuit 14 as viewed in FIG. 2. Therefore, even with the key switch 4 off, a leaky switch 4 may complete the charge lamp path from the battery 3 to ground through diode 123 and the collector to emitter junction of transistor 122. The resulting leackage current, 30 to 60 μA or so, may be sufficient to cause diode 123 and transistor 122 to immediately conduct so that the voltage $V_2$ developed across diode 123 and transistor 122 reaches about 2 volts as seen by curve A in FIG. 2. If such situation occurs, NPN and PNP transistors 130 and 131 of the power supply circuit 13 may be biased into conduction so that as in the manner described above, the field-excitation path is completed, thereby allowing a continuous field current flow of about 4 amps. And, if this condition is prolonged, the battery 3 will be charged excessibly. In order to avoid such detrimental situation to be caused by a leakage current, a typical counter measure of well known design provides a bypass resistor or the like. Curve B in FIG. 2 shows the improved voltage-current characteristics at $T_3$ with the by pass resistor parallely connected between the anode of diode 123 and ground, in order not to energize NPN and PNP transistors 130 and 131 of the power supply circuit 13 by the leakage current flow from the battery 3 through leaky switch 4. By the way, the potential at $T_3$ changes in three modes, ranging from zero volt (key switch 4 OFF), 2 volts (key switch 4 ON and no generation of power), and 14 volts (key switch 4 ON and generation of power effected) so that there is much power consumption in the bypass resistor during the normal voltage regulating operation where key switch 4 is closed and the external terminal voltage at $T_3$ is almost the same voltage (14 volts) as the positive terminal voltage of battery 3. Moreover, another problem that the charge lamp 4 dimly lights up during the normal operation, may occur if resistance value of such bypass resistor is not appropriately selected.

Accordingly, the malfunction preventing circuit 14, here composed of a series combination of resistor 141 (corresponding to the bypass resistor) and NPN transistor 140, is a total solution to those problems, that is, even if a leakage current flows from the battery 3 to the external terminal $T_3$, transistor 140 is driven to draw such leakage current through resistor 141 so that the terminal voltage at $T_3$ has substantially linearly changing characteristics with respect to the flowing current therethrough when the flowing current is a relatively small current as viewed in FIG. 2, thereby preventing the energization of the power supply circuit 13. On the other hand, after the output of the alternator 2 once builds up and the normal voltage regulating operation is effected where key switch 4 is duly closed and a relatively high voltage appears at the external terminal $T_3$, transistor 140 is held off, thus presenting no current through resistor 141, resulting in no power consumption in resistor 141.

Figure 3:
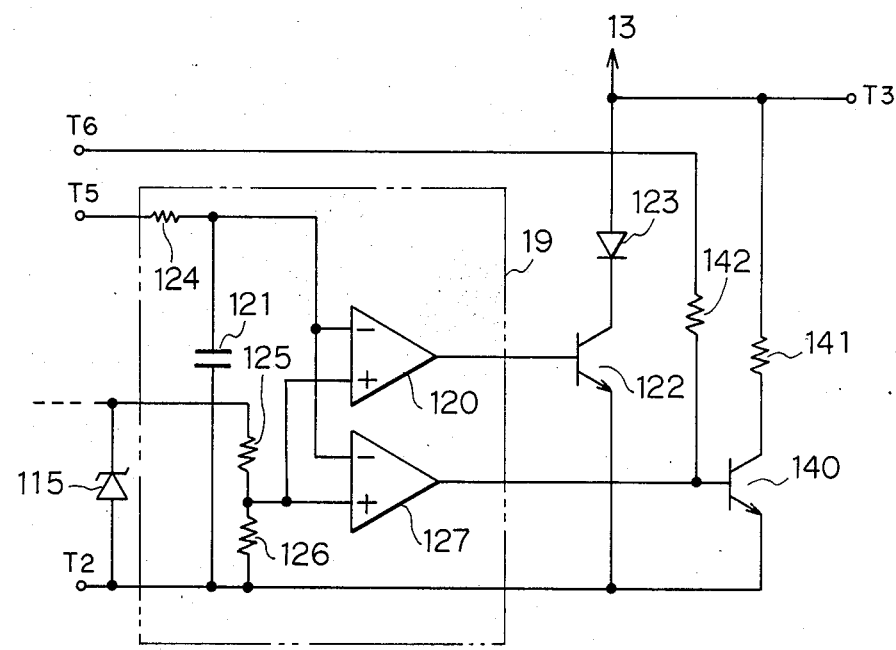
FIG. 3 is an electric wiring diagram of a second embodiment according to the present invention.

Referring now to FIG. 3, a second embodiment according to the present invention, in which the charge lamp drive circuit 19 is modifed and composed of another comparator 127 for driving transistor 140, in addition to various circuit components referred to in the first embodiment. In FIG. 3, the commonly connected inverting terminal of comparators 120 and 127 is connected to $T_5$ through resistor 124, and the commonly connected non-inverting terminal is connected to the reference voltage juncture between resistors 125 and 126. The output of comparator 120 is directly connected to the base of transistor 122, the emitter of which is grounded and the collector to the power supply circuit 13 through diode 123. The output of comparator 127 is connected to both $T_6$ through resistor 142 and the base of transistor 140, the emitter of which is ground and the collector is connected to $T_3$ through resistor 141. With the construction described above, since transistors 122 and 140 are separately controlled by comparators 120 and 127 respectively, thereby holding off transistor 122 while holding on transistor 140 when key switch 4 is opened, thus resulting in no power consumption in the base bias line of transistor 122 as compared in the first embodiment.

Figure 4:
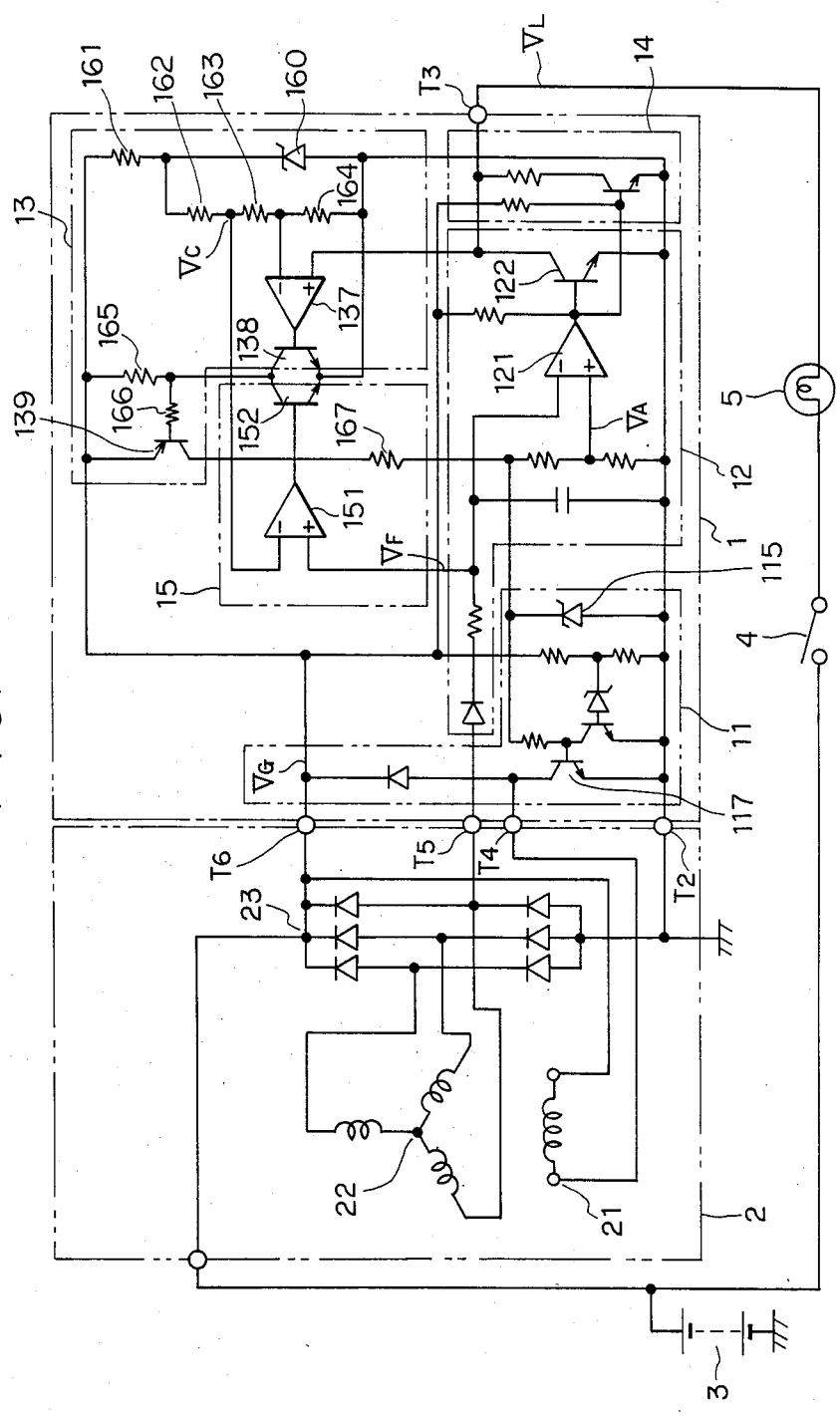
FIG. 4 is an electric wiring diagram of a third embodiment but with a backup circuit.

Referring now to FIG. 4, a third embodiment according to the present invention, in which the terminal voltage detecting circuit 13 is modified and a backup circuit 15 is added to the first embodiment. For the third embodiment, references to the alternator 2, the voltage ragulating circuit 11, the charge lamp drive circuit 12, and the malfunction preventing circuit 14 are omitted as the circuit configurations and operation are the same as those described in the first embodiment.

The modified power supply circuit 13 of the third embodiment is here comprised of comparator 137, NPN and PNP transistors 138 and 139, Zener 160, and resistors 161 to 167. Connected in series between $T_6$ and ground are resistors 161 to 164 defining first to third taps therebetween, the first tap between resistors 161 and 162 connected to the cathode of Zener 160, the anode of which is grounded, the second tap ($V_C \approx 1V$) between resistors 162 and 163 connected to the backup circuit 15 which will be described later in detail, and the third tap ($V_B < V_{CEsat}$ of transistor 122) between resistors 163 and 164 connected to the inverting terminal of comparator 137, the non-inverting terminal of which is connected to both T₃ and the collector of transistor 122 of the charge lamp drive circuit 12. The output of comparator 137 is directly connected to the base of NPN transistor 138, the collector of which is connected to both T₆ through resistor 165 and the base of PNP transistor 139 through resistor 166, the emitter of which is directly connected to T₆. The collector of PNP transistor 139 is connected to Zener 115 through resistor 167, thereby forming the power supply path from the battery 3 to the voltage regulating circuit 11 through the emitter to collector junction of PNP transistor 139.

The backup circuit 15 is here composed of comparator 151 and NPN transistor 152. The inventing terminal of comparator 151 is directly connected to the second tap between resistors 162 and 163 of the power supply circuit 13 and the non-inverting terminal is connected to the inverting terminal of comparator 120 of the charge lamp drive circuit 12. The output of comparator 151 is connected to the base of NPN transistor 152, the collector and emitter of which are respectively connected to the collector and emitter of NPN transistor 138 of the power supply circuit 13.

With the construction of the third embodiment, the circuit operation will now be briefly described as those of the remaining circuits 11, 12 and 14 have been described in detail in the first embodiment.

Upon the closure of key switch 4, the potential $V_L$ at T₃ increases as current flows battery 3 through charge lamp 5. When the potential $V_L$ reaches the third tap voltage $V_D$, comparator 137 generates a high level output. The resulting output turns on NPN and PNP transistors 138 and 139, thereby completing the power supply path from the battery 3 to the voltage regulating circuit 11 and the charge lamp drive circuit 12 through the "on-state" transistor 139, starting at the positive terminal of the battery 3, the emitter to collector junction of transistor 139, resistor 167, Zener 115 to ground. At the same time, the field excitation circuit is completed via the field current controlling transistor 117. In the meanwhile, $V_A$ becomes higher than $V_F$ so that the high level output biases the base of transistor 122 into conduction, causing charge lamp 5 to light up. Thereafter, as the engine runs and the generation of power is effected, the output voltage $V_F$ at one of the windings 22 increases so as to bias NPN transistor 152 into conduction through the comparator 151 when $V_F$ is higher than $V_C$. In the meanwhile, when $V_F$ is higher than $V_A$, transistor 122 turns off, thus causing charge lamp 5 to come off. However, should a break in the lamp conductor occurs when the car is running, the potential $V_L$ at T₃ would decrease to zero being smaller than $V_D$, allowing transistor 138 to turn off. However, as above described, NPN transistor 152 of the backup circuit 15 is held on even at this time so that the power supply path through PNP transistor 139 continues supplying operational power to the voltage regulating circuit 11 whereby the regulator 1 can continue to control the generation of power of the alternator 2. Further, if the engine is run even though such a break in the charge lamp conductor (without a warning signal from charge lamp 5) has occured, the voltage $V_F$ at the winding 22 would increase due to remanence in the rotating field winding 21. And, according to the inventor's experiments, it has been confirmed that when the engine rotational speed is more than 2000 to 4000 rpm, the voltage $V_F$ becomes more than 1 volt. Accordingly, the voltage dividing resistors 162 to 164 are adequately chosen to generate about 1 volt reference voltage $V_C$. Therefore, even if the charge lamp 5 is broken and it will take some time for its replacement, voltage control operation of the charging system may be successfully effected through an intentional increase in engine rotational speed in order to generate voltage $V_F$ at the stator winding 22, which is higher than $V_C$. By the way, in the event that charge lamp 5 is not broken, an engine rotational speed of about 500 rpm or more may be sufficient for the alternator 2 to generate the voltage $V_F$ higher than the constant voltage $V_C$ of about 1 volt whereby the voltage regulation can be effected with engine speed being more than 500 rpm in normal operation.

What is claimed is:

1. In a vehicle battery charging system having a battery for outputting a battery voltage, a series combination of a key switch and a charge lamp, a current generator having stator windings for outputting a stator output voltage, a field winding and a full-wave rectifier, and a voltage regulator, the above mentioned components being arranged to control the field current through the field winding in accordance with a predetermined voltage, said voltage regulator comprising:

(1) voltage control circuit means for switching ON and OFF said field current flow and for maintaining said battery voltage to said predetermined voltage;
    (2) a terminal connected to said battery through said series combination of said key switch and said charge lamp;
    (3) a first NPN transistor connected between said terminal and ground whereby said first NPN transistor drives said charge lamp in response to said stator output voltage;
    (4) power supply circuit means for supplying operational power to said voltage control circuit means by completing a power supply path in response to a potential being generated at said terminal when said key switch is closed, and
    (5) a series combination including a semiconductor switch means and a resistor connected between said terminal and ground, said semiconductor switch means being activated at least when said key switch is opened in order to bypass leakage current therethrough.

2. A voltage regulator as set forth in claim 1, said power supply circuit means generating a first reference voltage when said key switch is closed and said first NPN transistor being controlled by a comparison between said stator output voltage and said first reference voltage, whereby said first NPN transistor is rendered conductive when said stator output voltage is less than said first reference voltage and nonconductive when said stator output voltage is above said first reference voltage.

3. A voltage regulator as set forth in claim 2, said semiconductor switch means further including a second NPN transistor being biased from said battery in response to a result of comparison between said stator output voltage and said first reference voltage, whereby said second NPN transistor cuts off when said stator output voltage is above said first reference voltage.

4. A voltage regulator as set forth in claim 3, further comprising backup circuit means responsive to said stator output voltage for supplying operational power to said voltage control circuit means when said stator output voltage reaches a predetermined value being above a value of said stator output voltage at a condition when said key switch is open.

5. A voltage regulator as set forth in claim 4, wherein the supply of the operational power from said backup circuit means to said voltage control circuit means is effected through said power supply path of said power supply circuit means.

6. A voltage regulator as set forth in claim 5, said power supply circuit means comprising:
   (1) a third NPN transistor having an emitter connected to ground and a base connected to said terminal, said third NPN transistor being rendered conductive in response to said potential being generated at said terminal when said key switch is closed, and
   (2) a PNP transistor having a collector connected to said voltage control circuit means, an emitter connected to said battery and a base connected to a collector of said third NPN transistor, whereby in response to said potential at said terminal when said key switch is closed, said power supply path may be formed between the positive terminal of said battery and said voltage control circuit through the emitter to collector junction of said PNP transistor.

7. A voltage regulator as set forth in claim 6, said backup circuit means comprising a fourth NPN transistor responsive to said stator output voltage, an emitter and a collector thereof respectively being connected to the emitter and the collector of said third NPN transistor, said fourth NPN transistor being rendered conductive when said stator output voltage reaches said predetermined value, so that even when said terminal is substantially disconnected from said battery and when said stator output voltage is above said predetermined value, said power supply path is completed through said PNP transistor by the conduction of said fourth NPN transistor, whereby said voltage regulator can successfully operate the battery charging system while maintaining said battery voltage to said predetermined voltage.

* * * * *

UNITED STATES PATENT AND TRADEMARK OFFICE
CERTIFICATE OF CORRECTION

PATENT NO. : 4,665,354

DATED : May 12, 1987

INVENTOR(S) : Takeshi Sada, Hidetoshi Kato, Hiroshi Shibata, Kazumasa Mori, Nobuo Mayumi, Hirohide Sato, Yoshio Akita, Shigeru Tanaka It is certified that error appears in the above-identified patent and that said Letters Patent is hereby corrected as shown below:

ON THE FIRST INFORMATION PAGE:

Please change "[30] Foreign Application Priority Data

Aug. 8, 1984 [JP]   Japan .................. 59-167216

Aug. 27, 1985 [JP]   Japan .................. 59-177778" to

--[30] Foreign Application Priority Data

Aug. 8, 1984 [JP]   Japan .................. 59-167216

Aug. 27, 1984 [JP]   Japan .................. 59-177778--

Signed and Sealed this

Tenth Day of November, 1987

Attest:

DONALD J. QUIGG

*Attesting Officer*        *Commissioner of Patents and Trademarks*